July 10, 1962 S. C. LOCKHART ET AL 3,043,927
ACCELERATION AND DECELERATION DETECTOR SWITCH
Filed Dec. 7, 1959

*INVENTORS*
THEODORE FRAYER
STANFORD C. LOCKHART
BY
*J. B. Holden*
ATTORNEY

United States Patent Office 3,043,927
Patented July 10, 1962 }

3,043,927
ACCELERATION AND DECELERATION
DETECTOR SWITCH
Stanford C. Lockhart, Akron, and Theodore Frayer, North Canton, Ohio, assignors to The Goodyear Tire & Rubber Company, Akron, Ohio, a corporation of Ohio
Filed Dec. 7, 1959, Ser. No. 857,837
6 Claims. (Cl. 200—61.46)

The present invention relates to switches, and especially to a switch for detecting unusual acceleration and deceleration of a wheel with which the switch is operatively associated.

The present invention has particular merit with relation to various types of anti-skid apparatus used in vehicle braking systems. Some examples of anti-skid detection and/or control apparatus are found in previously issued U.S. Patents Nos. 2,744,699 and 2,799,462, but other types of control, or indicator apparatus have been developed heretofore for either automatically preventing excessive brake operation, or else for providing warning or indication means to the pilot or driver to indicate that either skid conditions are being approached in the vehicle or else that they exist to give immediate indication, or warning of such fact to the pilot so that brake application can be reduced and any, or further skid avoided. It is very desirable that skids be avoided so that maximum braking efficiency can be provided.

In various types of anti-skid systems available heretofore, the control means have comprised, in most instances, some type of fairly complex electronic control means and the systems have been relatively costly and are of appreciable size. As most anti-skid systems are used on aircraft, it is very important that the size of the control systems and the complexity thereof be held to a minimum so that no avoidable weight or volume be carried by the aircraft.

It is a general object of the present invention to provide a switch for use in detecting accelerations and decelerations in excess of normal of an associated wheel and wherein the detector switch is relatively uncomplicated and of a compact construction.

Another object of the invention is to provide a detector switch of the class described which includes an inertia wheel or flywheel driven through a planetary gear train and where a spring means is provided for positioning the reaction member in the planetary drive to obtain reactions based upon sudden accelerations or decelerations of the control wheel to register by changes of position on the reaction member in the switch and control system.

A further object of the invention is to provide a positive acting torsional spring and mass system sensitive to changes in speed for providing signals in anti-skid control systems, or the like.

The foregoing and other objects and advantages of the present invention will be made more apparent as the specification proceeds.

Particular attention is now directed to the accompanying drawings, wherein.

When referring to corresponding members shown in the drawings and referred to in the specification, corresponding numerals are used to facilitate comparison therebetween.

Figure 1:
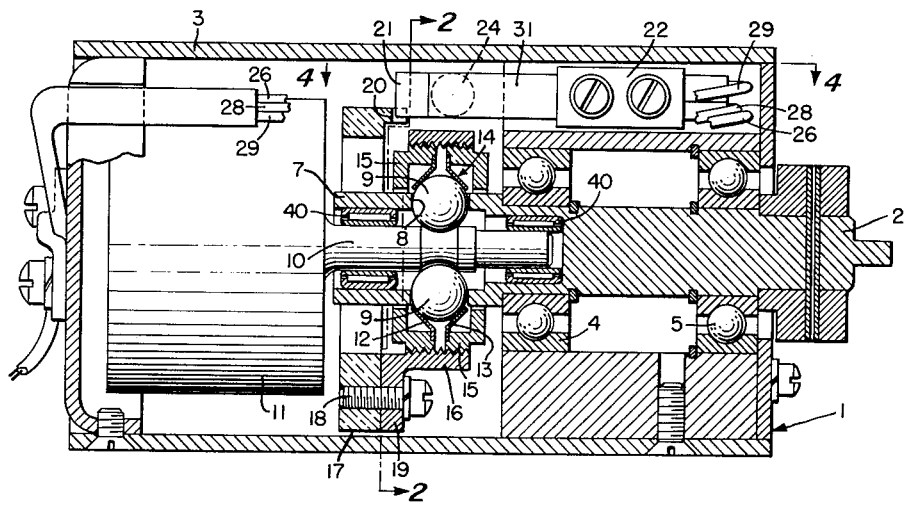
FIG. 1 is a longitudinal section through the novel switch embodying the principles of the invention.

This invention generally relates to an anti-skid control or warning system for combination with a vehicle wheel, and brake means for the wheel, and the system comprises an input shaft for operative connection to the wheel to be driven at a speed proportional thereto, a plurality of planet gears operatively carried by the shaft, a ring gear operatively engaging the planet gears, a sun gear operatively engaging the planet gears to function as a flywheel in the system, a resilient member engaging the ring gear to position it for limited arcuate movement about the input shaft dependent upon the reaction of the ring gear to rotation of the sun gear, a pair of contact means positioned adjacent opposite portions of the resilient member for electric circuit closing action with movement of the resilient member in either direction, and circuit means connected to the resilient member and to the contact means to provide an operative impulse dependent upon the action of the sun gear as a flywheel and its action on the ring gear and resilient member with changes in speed of the vehicle wheel to indicate sudden acceleration and deceleration thereof.

Particular attention now is directed to the details of the structure shown in the drawings, and a detector switch, or detector apparatus of the invention is indicated as a whole by the numeral 1. This detector switch 1 includes an input, or planetary gear carrier shaft 2 that extends from and is suitably operatively journalled in a tubular switch frame 3, as by means of bearings 4 and 5. Suitable means (not shown) of any desired type, can be used for connecting the input shaft 2 to a wheel 6 so that the input shaft 2 will always be driven at a speed proportional to the speed of the wheel 6, or other member to be controlled by the apparatus of the invention. Braking forces are applied to the wheel 6 by known means, and the detector switch 1 is used to detect accelerations and/or decelerations of the wheel in excess of normal.

As a feature of the present invention, the input shaft 2 has a tubular portion 7 at its axially inner end. This tubular portion 7 has in this embodiment of the invention a plurality of equally circumferentially spaced holes or apertures 8 provided therein. Planet gears, in this instance (toothless) balls 9, are snugly received in each of the apertures 8 and extend radially from both surfaces of this tubular portion 7 of the input or planetary gear carrier shaft 2. The planet gears 9 are urged radially inwardly to engage and drive a flywheel, or sun gear shaft 10 that extends axially within the tubular portion 7 and has a flywheel or inertia wheel 11 integrally, or otherwise suitably fixedly secured to the shaft 10. Hence an inertia member is provided in the switch 1 for desired acceleration and deceleration indicator action, as hereinafter described.

To complete the planetary gear system, the radially outer portions of the planet gears 9 have ring gear means compressed radially into engagement therewith. In this instance, the ring gear means comprise a pair of belleville washers, or springs 12 and 13 that engage opposed radially outer portions of the planet gears 9 to form a ring gear 14. Any suitable members, such as a pair of lock rings 15, 15 engage the belleville springs 12 and 13 to retain them in engagement with the planet gears 9 and these lock nuts, or rings 15, 15 are secured in place by being engaged by a threaded section of a positioning, or lock sleeve 16. The positioning or lock sleeve 16 is secured to a terminal ring 17 by a cap screw 18 that secures a flange 19 on the sleeve 16 to the terminal ring 17. The terminal ring 17 has an axially extending slot 20 formed in one portion of the periphery thereof and it receives a movable end of a leaf spring 21 of a double throw, center off switch 22 therein. The switch 22 is suitably secured to the tubular frame 3 and it positions a pair of contacts 23 and 24 adjacent the leaf spring 21 and contacts 25, 25 provided on the opposite faces thereof. Thus by placing a movable end of the leaf spring 21 in operative engagement with the positioning sleeve 16, on sudden acceleration or deceleration forces applied to the planetary gear system, the reaction member, or ring 14 in the system will be moved arcuately a short distance in one direction because of the flywheel 11 and its action on the ring gear. The length and strength of the leaf spring 21 and the weight of the flywheel 11 and other portions of the apparatus can be so designed and correlated with each other that predetermined amounts of acceleration and deceleration will result in the leaf spring 21 being moved arcuately a sufficient distance to engage either of the stationary contacts 23 or 24 on the switch 22 by one of the contacts 25 on the leaf spring for closing an associated electrical circuit to provide an indicator or warning signal for use in the apparatus or control means associated with the switch of the invention.

The planet gears 9 rotatively couple the input shaft 2 to the sun gear shaft 10.

A lead 26 extends into the switch 1 of the invention and is connected to the leaf spring 21 by a suitable connection such as by a terminal 27, while other leads 28 and 29 extend to terminals on or otherwise connect to contact arms 30 and 31 forming a portion of the control switch 22 and positioning the contacts 23 and 24 therein so that suitable control circuits can be connected to the contacts 23, 24 and 25 for control action, as hereinafter described.

Figure 3:
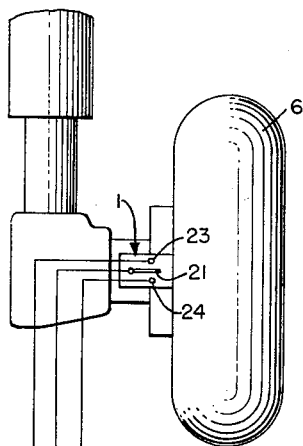
FIG. 3 is a diagrammatic drawing showing the connections and control system of the invention in diagrammatic form.
Figure 2:
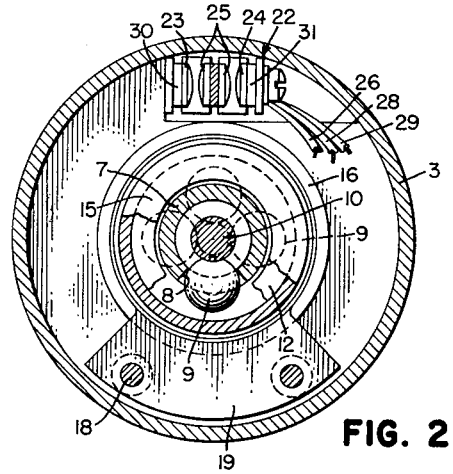
FIG. 2 is a cross section taken on line 2—2 of FIG. 1.
Figure 4:
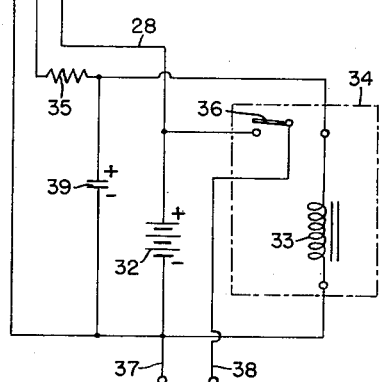
FIG. 4 is a fragmentary plan, taken on line 4—4 of FIG. 1, of certain contact means in the switch of the invention.
Figure 4:
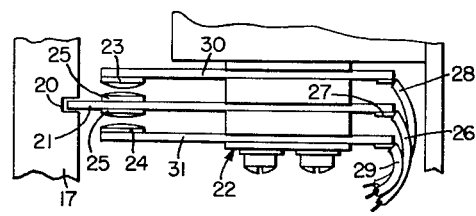

The actual control circuits of the invention may be of substantially conventional nature, and FIG. 3 shows such a circuit wherein a power supply in the form of a D.C. 28 volt battery is shown at 32. This power supply 32 from the positive terminal thereof connects by lead 28 to the deceleration control contact 24 of the switch 22, so that when the leaf spring 21 is caused to move over to engagement with the contact 24, a circuit through an energization coil 33 of a control relay 34 is formed. Usually a limiting resistance 35 is connected in series with this operating coil. Actuation of the control relay 34 closes a contact 36 controlled by the relay to supply an energization impulse or circuit to output leads 37 and 38. These output leads connect to desired control members for supplying a warning, or indication to the pilot or driver that skid conditions either are approaching, or actually are in existence to notify the pilot to remove braking pressures, or else to effect such action automatically in the braking circuit, as desired. Closing the circuit between the leaf spring 21 and the deceleration contact 24 also energizes a condenser 39 provided in the circuit. Preferably even after the deceleration contacts in the control apparatus of the invention have opened, the condenser 39 will maintain the control relay 34 energized for a few seconds to maintain the skid warning action to the pilot. However, upon acceleration of the vehicle and contact between the leaf spring 21 and the acceleration control terminal 23 is effected, the condenser 39 will be rapidly discharged and no further skid warning signal will be sent through the output leads 37 and 38, as the relay 34 will be deenergized very rapidly.

Usually the flywheel, or sun gear shaft 10 is journalled within the tubular portion 7 of the input shaft by conventional means, such as bearings 40, 40. Preferably the ring, or positioning piece 17 with slot 20 therein is formed from insulation material. The switch 22 has one portion of the spring 21 secured thereto.

By the apparatus of the invention, it will be seen that the detector switch 1 of the invention is a torsional spring and mass system sensitive to changes in speed or accelerations. The reaction forces of the accelerations will operate the double throw center off switch to provide an electrical signal at the preselected acceleration sensitivity selected so that proper control systems or other actions, as desired, can be connected to the output leads 37 and 38 to obtain the desired action in anti-skid controls or other apparatus with which the novel detector switch is used. The acceleration contact 23 is used to deenergize the relay 34 and positively terminate any warning signal in this embodiment of the invention. Thus it is believed that the objects of the invention have been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. In apparatus for detecting accelerations and decelerations in excess of a preselected rate, a control switch comprising a frame, a planet gear carrier shaft journalled in said frame and adapted to be connected to the wheel to be controlled to be driven at a speed proportional thereto, said planet gear carrier shaft having a tubular section with a ring of circumferentially spaced holes therein, a spherical planet gear received in each of said holes in said planet gear carrier shaft and extending radially from both surfaces of said tubular section of such shaft, a ring gear engaging the radially outer portions of said planet gears, a leaf spring secured at one end to said frame and extending therefrom to engage said ring gear to aid in resiliently positioning such gear for limited arcuate movement, a flywheel, a shaft secured to said flywheel and extending therefrom into said tubular section of said planet gear carrier shaft, said second-named shaft engaging the radially inner portions of said planet gears to be driven thereby to rotate said flywheel, and a pair of contact means individually operatively positioned on said frame adjacent said leaf spring to engage said leaf spring on distortion thereof in either direction by reaction of said ring gear to sudden accelerations and decelerations of said flywheel to close different electrical circuits with said leaf spring to send electrical impulses indicating measured acceleration and deceleration action.

2. Apparatus for detecting accelerations and decelerations in excess of a preselected rate, which apparatus comprises a frame, a planet gear carrier shaft journalled in said frame and adapted to be connected to a rotary means to be driven at a speed proportional thereto, said planet gear carrier shaft having a tubular section with a ring of circumferentially spaced holes therein, a spherical planet gear received in each of said holes in said planet gear carrier shaft and extending radially from both surfaces of said tubular section of such shaft, a ring gear in compression engagement with the radially outer portions of said planet gears, a leaf spring secured to said frame and engaging said ring gear to resiliently position such gear for limited arcuate movement, a flywheel, a shaft secured to said flywheel and extending therefrom into said tubular section of said planet gear carrier shaft, said second-named shaft having compression engagement with the radially inner portions of said planet gears to be driven thereby to rotate said flywheel, and a pair of contact means operatively positioned adjacent said leaf spring to engage said leaf spring on distortion thereof in either direction by reaction of said ring gear to accelerations and decelerations of said flywheel to close different electrical circuits with said leaf spring to provide an electric impulse for control action.

3. A detector apparatus of the class described comprising an input shaft for operative connection to a rotary member to be driven at a speed proportional thereto, a plurality of planet gears operatively carried by said shaft, a ring gear operatively engaging said planet gears, a sun gear operatively engaging said planet gears to function as a flywheel in the planetary gear system, a resilient member engaging said ring gear to position it for limited arcuate movement about said input shaft dependent upon the reaction of said ring gear to rotation of said sun gear, and contact means positioned adjacent said resilient member for electric circuit closing action with movement of said resilient member in a predetermined direction, said switch being adapted to have circuit means connected to said resilient member and to said contact means to provide an operative impulse dependent upon the action of said sun gear as a flywheel and its action on said ring gear and resilient member with changes in speed of the rotary member to indicate excessive deceleration thereof.

4. A control comprising a frame, an input shaft for operative connection to a rotary member to be driven at a speed proportional thereto, said shaft having a tubular end portion, a plurality of planet gears operatively carried by said shaft at said tubular end portion, a ring gear operatively engaging said planet gears, means forming a sun gear having a spindle operatively engaging said planet gears within said shaft tubular end portion to function as a flywheel in the system, and a leaf spring member secured at one end to said frame and at its other end engaging said ring gear to position it for limited arcuate movement about said input shaft dependent upon the reaction of said ring gear to rotation of said sun gear, the arcuate movement of said ring gear being usable to provide a control action.

5. A control comprising a frame, an input shaft for operative connection to a rotary member to be driven at a speed proportional thereto, said shaft having a tubular end portion, a plurality of planet gears operatively carried by said shaft at said tubular end portion, a ring gear operatively engaging said planet gears, means forming a sun gear having a spindle operatively engaging said planet gears within said shaft tubular end portion to function as a flywheel in the system, a leaf spring secured adjacent one end thereof to said frame and extending therefrom to engage and position said ring gear with relation to said frame, a pair of contact means positioned adjacent opposite portions of said resilient member for electric circuit closing action with movement of said resilient member in either direction, said ring gear having limited arcuate movement about said input shaft dependent upon the reaction of said ring gear to rotation of said sun gear and the action of said leaf spring, and a contact member on said resilient member adjacent said contact means to provide a contact closing action dependent upon the action of said sun gear as a flywheel and its action on said ring gear and resilient member with changes in speed of the rotary member to indicate sudden acceleration and deceleration thereof.

6. A control comprising a frame, an input shaft for operative connection to a rotary member to be driven at a speed proportional thereto, said shaft having a tubular end portion, a plurality of planet gears operatively carried by said shaft at said tubular end portion, a ring gear positioned radially outwardly of and operatively engaging said planet gears, a sun gear having a spindle operatively engaging said planet gears within said shaft tubular end portion to function as a flywheel in the system, a resilient member anchored to said frame and engaging said ring gear to secure it to said frame for limited arcuate movement about said input shaft dependent upon the reaction of said ring gear to rotation of said sun gear, a pair of contact means positioned adjacent opposite portions of said resilient member for electric circuit closing action with movement of said resilient member in either direction, and a contact member secured to said resilient member at a point adjacent said contact means to provide a contact closing action dependent upon the action of said sun gear as a flywheel and its action on said ring gear and resilient member with changes in speed of the rotary member to indicate sudden acceleration and deceleration thereof.

References Cited in the file of this patent

UNITED STATES PATENTS

| | | |
|---|---|---|
| 2,703,992 | Hine et al. | Mar. 15, 1955 |
| 2,934,616 | Yarber | Apr. 26, 1960 |
| 2,935,714 | Barden et al. | May 3, 1960 |